US012247715B2

(12) United States Patent
Mueller

(10) Patent No.: US 12,247,715 B2
(45) Date of Patent: Mar. 11, 2025

(54) COOLING MODULE AND HEADLIGHT

(71) Applicant: MERCEDES-BENZ GROUP AG, Stuttgart (DE)

(72) Inventor: Axel Mueller, Schorndorf (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/704,102

(22) PCT Filed: Sep. 28, 2022

(86) PCT No.: PCT/EP2022/076960
§ 371 (c)(1),
(2) Date: Apr. 24, 2024

(87) PCT Pub. No.: WO2023/072517
PCT Pub. Date: May 4, 2023

(65) Prior Publication Data
US 2024/0410545 A1 Dec. 12, 2024

(30) Foreign Application Priority Data
Oct. 29, 2021 (DE) ..................... 10 2021 005 388.5

(51) Int. Cl.
*F21S 45/43* (2018.01)
*F21S 41/20* (2018.01)
*F21V 29/67* (2015.01)

(52) U.S. Cl.
CPC ........... *F21S 45/43* (2018.01); *F21S 41/2805* (2024.05); *F21V 29/677* (2015.01)

(58) Field of Classification Search
CPC ...... F21S 41/2805; F21S 45/43; F21V 29/677
See application file for complete search history.

(56) References Cited

U.S. PATENT DOCUMENTS

2014/0241001 A1* 8/2014 Yoshikawa ........... F21V 29/503 362/547
2016/0290608 A1 10/2016 Ohashi et al.

FOREIGN PATENT DOCUMENTS

| | | | |
|---|---|---|---|
| DE | 102007057056 | A1 | 5/2009 |
| DE | 102013113529 | A1 | 6/2015 |
| FR | 3058503 | A1 | 5/2018 |
| JP | 2007035335 | A | 2/2007 |
| JP | 2015103335 | A | 6/2015 |
| KR | 101417403 | B1 | 7/2014 |

(Continued)

OTHER PUBLICATIONS espace.net English translation of description JP2007035335A (Year: 2024).*

(Continued)

*Primary Examiner* — Anabel Ton
(74) *Attorney, Agent, or Firm* — PATENT PORTFOLIO BUILDERS PLLC

(57) ABSTRACT

A cooling module includes a cooling element having a closed central part and heat-conducting elements on two sides of the central part, as well as a feeding apparatus for air. The feeding apparatus is designed as an integrated twin fan which, on the one hand, feeds ambient air from one side of the central part and, on the other hand, feeds ambient air from the other side of the central part to the cooling element.

8 Claims, 1 Drawing Sheet

(56) References Cited

FOREIGN PATENT DOCUMENTS

WO 2020053068 A1 3/2020

OTHER PUBLICATIONS

Innovation Q+ NPL Search (Year: 2024).*
International Search Report and Written Opinion mailed Dec. 15, 2022 in related/corresponding International Application No. PCT/EP2022/076960.
Office Action created Apr. 5, 2022 in related/corresponding DE Application No. 10 2021 005 388.5.

* cited by examiner

COOLING MODULE AND HEADLIGHT

BACKGROUND AND SUMMARY OF THE INVENTION

Exemplary embodiments of the invention relate to a cooling module having a cooling element, as well as to a headlight having such a cooling module, in particular for a motor vehicle.

Modern headlights have many components in their interior, which emit heat during operation. In addition to the LEDs typically used as lighting means today, these are stepper motors and control devices. Due to the sometimes very high electric currents, heat arises in the region of the wires and contacts due to the electrical resistance of the cabling. To avoid the typically self-contained internal volume of the headlight overheating, because this would force a reduction in power, or could even cause damage to components, this waste heat must be removed from the internal volume of the headlight. Heat transport via the cover disc, which is also described as a front disc or cover glass, typically serves this purpose. In particular when used in a vehicle, this means that a relatively large quantity of heat can be removed by a corresponding flow of the airstream around the cover disc when the vehicle is travelling. Although the plastic housing of the headlight also contributes to heat transport itself, the materials used and the typical installation location, with relatively small distances from the surrounding components, limit efficient heat transfer. Thus, only a small part of the waste heat can be emitted via the housing, for example into the engine compartment of the vehicle.

One approach to improving the removal of the waste heat is typically to install cooling elements and a fan within the headlight, in order to transport the waste heat in a targeted manner from the components producing the waste heat to the cover disc, in the region of which it can be emitted. In this context, reference can be made to a vehicle headlight having a cooling air duct according to DE 10 2013 113 529 A1.

Overall, however, it is the case heat transport via the cover disc cannot be increased indefinitely, in particular at low speeds of travel or when the vehicle is stationary and at higher temperatures. A worst-case scenario would be, for example, a high beam switched on when a vehicle is stationary, and additional sunlight is shining on the cover discs of the headlights. However, it is not only in such a scenario, but also in many everyday scenarios, in particular those with a lower speed of travel, that higher temperatures are present within the headlight than are actually reasonable or desirable. In practice, this leads to a drop in the efficiency of the components at higher temperatures, meaning that their power has to be reduced in order, on the one hand, to protect the component and, on the other hand, not to produce even more waste heat.

From the prior art, in addition to the operation of a fan in the interior of the self-contained volume of the headlight, the use of a cooling element having two sides is thus also known, with one of the sides being arranged in the interior of the headlight, and the other side being arranged outside. In this context, reference can be made to DE 10 2007 057 056 A1. Such a cooling element is described in principle therein, wherein the heat-conducting connection between the portions located in the environment and the portions located in the interior of the headlight is implemented via a central part, which is here designed as a thermoelectric cooler, and thus to actively influence the flow of heat from the inside to the outside. This structure, together with the fan arranged in the interior volume of the headlight, may be able to reduce the temperature in the structure, but is very complex overall, and requires both the control of this thermoelectric cooler on the one hand and of the fan installed in the interior volume on the other hand.

JP 2015-103335 A describes the use of heat sinks to cool LEDs, which are flowed over with cooling air by two parallel fans. Via a baffle plate, it can be ensured that the air flows of the parallel fans do not mix unnecessarily significantly before reaching the heat sinks.

A very complex cooled headlight is known from WO 2020/053068 A1. The headlight is cooled via an air conditioning circuit, which is connected to the internal region of the headlight via liquid heat exchangers or a liquid heat exchanger and cooling ribs. The structure is complex to produce, requires many components, and a correspondingly large amount of installation space to position the components of the air conditioning circuit next to the headlight.

Exemplary embodiments of the present invention are directed to an improved integrated cooling module, which is improved in relation to the structure specified in the prior art, and which can preferably be used in an improved headlight.

The cooling module according to the invention represents an integrated cooling module having a cooling element, on the one hand, and a feeding apparatus for air, on the other hand. The cooling element comprises a closed central part which seals the regions lying on both sides thereof against one another and comprises heat-conducting elements on the two sides of this central part. According to the invention, it is provided that the feeding apparatus is designed as an integrated twin fan which, on the one hand, feeds ambient air from one side of the central part and, on the other hand, feeds ambient air from the other side of the central part to the cooling apparatus. The cooling apparatus is thus, for example, a plate having heat-conducting elements on one side and on the other side. According to a very advantageous development of the integrated cooling module according to the invention, these heat-conducting elements can be designed as heat-conducting ribs or fins, or as heat-conducting fingers, pins or knobs. A combination of these elements, or the combination with other measures which enlarge the surface area of the cooling element on the respective side, e.g., roughening the surface or similar, are also conceivable.

Via this cooling element alone, heat can now be transported from one side with the heat-conducting elements to the other side with the heat-conducting elements. Both sides can be flowed over in parallel via the twin fan, such that, for example, warm air is fed to the heat-conducting elements of the first side for cooling and simultaneously, on the other side, cooler air can be fed to remove the waste heat transferred from the first side to the second side.

According to the invention, it is provided that the twin fan has two fan wheels that are sealed against each other and a shared electric drive motor for the two fan wheels. This structure is exceptionally simple and efficient, and allows a good functionality with low hardware, space, and energy requirements. Preferably, the one electric drive motor for the two fan wheels can be arranged centrally between the two fan wheels.

According to an exceptionally favorable development, the twin fan can be designed as a radial fan so that, for example, it draws in the drawn-in air laterally in relation to the respective side or its surface of the cooling element, and then emits it again over the surface of the respective side of the central part and preferably between the heat-conducting elements. Warm air can thus be fed efficiently to the heat-conducting elements on one side, such that the heat is transported from one side to the other side, and simultaneously cooling air can be fed in the same way on the other side, in order to efficiently remove the heat transferred from the first side to the second side.

In this particularly favorable embodiment, it is the case that the twin fan is designed such that it feeds the ambient air from the respective side of the cooling element or its central part on the pressure side to the heat-conducting elements, and correspondingly draws in the ambient air, and in the embodiment as a radial fan specified above preferably perpendicular to this direction.

In principle, such a cooling module can always be used as an integrated cooling module where heat is to be transferred from one side to the other, in particular in components having confined installation space, because the highly-integrated and compact structure, which is made possible by the cooling module according to the invention, is particularly advantageous here.

It is the case that, according to a very advantageous development of the cooling module according to the invention, the latter can be designed integrated into a housing that has air inlet openings on two opposite sides for the air drawn in by the twin fan and, spaced apart from the latter, air outlet openings for outputting air after it flows through the heat-conducting elements of the cooling element. The cooling element and the twin fan can thus be efficiently arranged in such a housing. The housing can then be installed in a suitable cutout of a wall. Screwing or clipping can, for example, be used for this purpose. The heat can then be transported from one side of the wall to the other side of the wall. This can be implemented exceptionally simply and efficiently by connecting only one electric connection for the one drive motor to a power source. Further measures, connections or the like are not necessary. The power can be supplied both from one side and from the other side of the wall, depending on what is more expedient with regard to mounting.

A preferred use is in the context of a headlight. Such a headlight having a self-contained internal volume, a transparent cover disc, and lighting means, which comprise at least light-emitting diodes, their control electronics and the like, can now be ideally cooled via the cooling module according to the invention. The headlight according to an aspect of the invention provides that the central part of the cooling element of the cooling module forms a part of the boundary of the internal volume, such that the heat-conducting elements of one side protrude into the internal volume and the heat-conducting elements of the other side protrude into the surrounding environment. In a completely sealed internal volume of the headlight, heat that arises can then be guided via one side of the twin fan to the cooling element or its heat-conducting elements. From the internal volume of the headlight, which can be completely sealed, through the cooling element or its central part, the heat then reaches the heat-conducting elements on the other side. It is emitted into the environment there, supported by ambient air which is guided from the other part of the twin fan via the corresponding heat-conducting elements, in order thus to achieve a cooling with forced convection.

Correspondingly, according to a very advantageous embodiment of the headlight, it is provided that the twin fan is equipped, on the one hand, to circulate air in the internal volume and to feed it to the cooling element of the cooling module and, on the other hand, to feed ambient air to the other side of the cooling element. The two air flows are materially separate, and thus the air does not mix. The heat is removed from the headlight so efficiently that, in addition to heat emission via the cover disc, heat can also be emitted in an additional region, for example an engine compartment or the like.

Even if, in principle, the use of such a headlight is suitable for all possible applications, it can in particular be provided that this headlight is used as a front headlight in a vehicle, in particular in a motor vehicle, and here preferably in a non-rail land vehicle, e.g., a passenger car or HGV.

Further advantageous embodiments of the cooling module according to the invention and of the headlight according to the invention also result from the exemplary embodiment, which is described in more detail in the following with reference to the figures.

BRIEF DESCRIPTION OF THE DRAWING FIGURES

Here:

DETAILED DESCRIPTION

Figure 1:
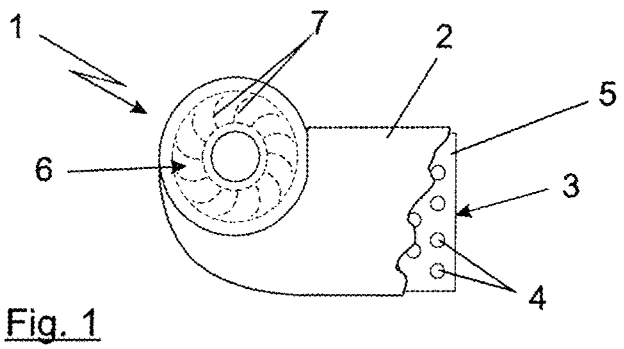
FIG. 1 shows a side view of a possible embodiment of a cooling module according to the invention in a partial sectional view.

In the depiction of FIG. 1, an integrated cooling module labelled 1 as a whole can be seen in a side view. A housing 2 of the integrated cooling module 1 is shown partially in a sectional depiction, in order to reveal a cooling element 3 having a few indicated cooling pins 4 on the side 5 facing the observer. In addition to this cooling element 3, a twin fan 6 is integrated into the housing 2, the twin fan being designed as a radial fan, wherein one of the radial fan wheels 7 is indicated by a dashed line in the housing, because it is covered by the actual housing 2.

Figure 2:
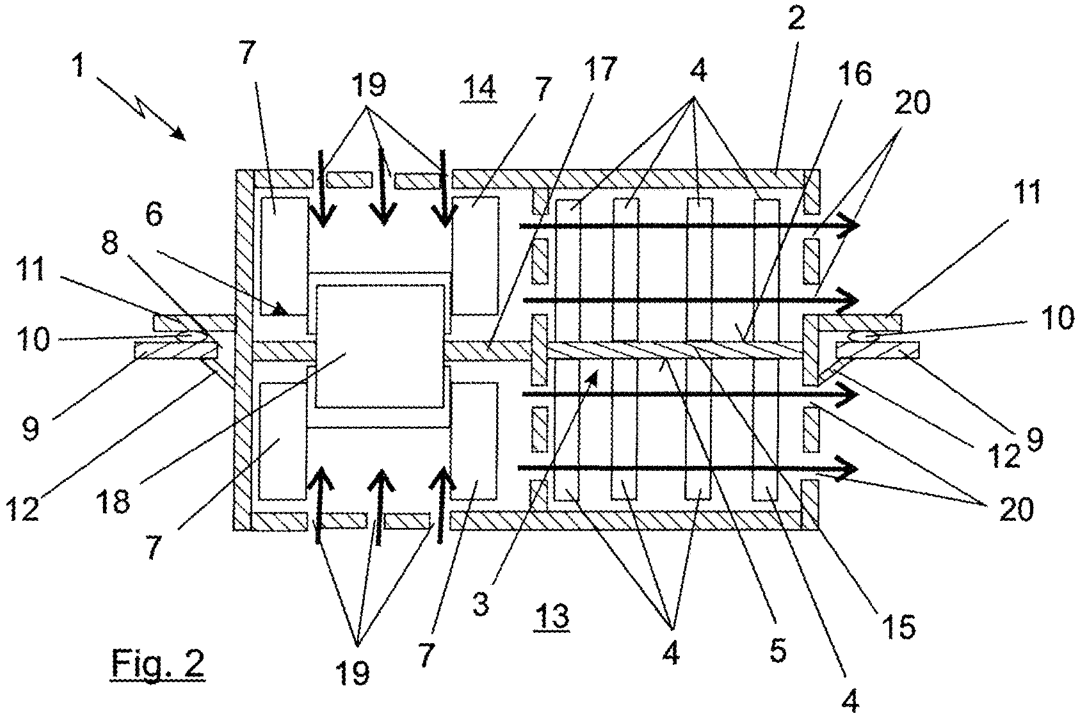
FIG. 2 shows an aerial view of the cooling module according to FIG. 1 in a sectional view.

The functionality can be best depicted in an aerial view, which can be seen in the sectional depiction of FIG. 2. The housing 2 of the cooling module 1 is received in an opening 8 of a wall labelled 9. For this purpose, a peripheral seal 10 between the wall 9 and a flange 11 is provided on the housing. The connection can, for example, be implemented by adhering, screwing, riveting, or the like. In particular, it can be implemented by clipping, for which purpose clips 12 indicated in the depiction of FIG. 2 can be seen as part of the housing. If the housing is inserted from above into the opening 8 in the depiction of FIG. 2, then it can be clipped simply and efficiently to the wall 9, preferably while deforming the installed seal 10, such that the structure is completely sealed.

An interior volume labelled 13 should now lie below the wall 9, and above the wall an outer volume labelled 14 in the surrounding environment of the cooling module 1. Via the cooling module 1, heat should now be transferred from one to the other of the two volumes 13, 14, for example from the internal volume 13 into the external volume 14 forming the surrounding environment of the structure. The cooling element 3 has a closed central part 15 that is received in the housing 2 such that the region facing the internal volume 13 is sealed off from the region facing the external volume 14. The first side 5 of the cooling element 3 or of its central part 15, here facing downwards, carries some of the cooling pins 4, as does the opposite second side 16. The seal of the region neighboring the two sides 5, 16 continues on through the housing, and is lengthened by an intermediate wall 17, which is arranged flush to the central part 15 of the cooling element 3. This intermediate wall 17 has an opening for an electric drive motor 18, which is part of the twin fan 6 and drives two impellers with their respective guide vanes 7 in parallel. The regions of the two impellers are also sealed against each other by the intermediate wall 7 and the drive motor 18, such that in the event of a sealed installation of the housing 2 in the opening 8 of the wall 9, a complete seal of the internal volume 13 against the external volume 14 is possible.

Figure 3:
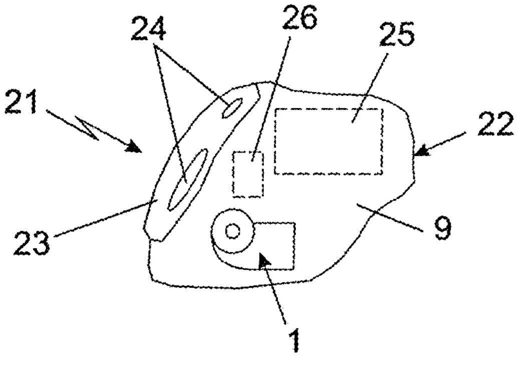
FIG. 3 shows a schematic depiction of a vehicle headlight in an embodiment according to the invention.

On the underside of the cooling module 1 shown facing the internal volume 13, air is now drawn in from the internal volume 13 via air inlets 19 and fed by the rotating guide vanes 7 between the cooling pins 4 of the first side 5 of the cooling element 3. Once the air has cooled down accordingly by emitting heat to the cooling pins 4 of the cooling element 3, the air then exits again from outlet openings 20 of the side of the housing 2 facing the internal volume. A circulation of the air in the internal volume 13, e.g., the internal volume 13 of a headlight 21, as depicted in FIG. 3, is thus enabled. The circulated air is cooled in the region of the cooling pin 4 of the cooling element 3 simultaneously with the circulation.

The cooling element 3 with its cooling pins 4 and the central part 15 can, for example, consist of aluminum. The heat is then very effectively conducted from the cooling pins 4 to the first side 5 of the central part 15 through the central part 15 to the cooling pins 4 on the second side 16 of the cooling element 3 or its central part 15. In addition to the impeller shown at the bottom in the depiction of FIG. 2, the twin fan 6 now moves the impeller having the guide vanes 7 shown at the top in the depiction of FIG. 2. For this purpose, both of the impellers can be arranged on one and the same shaft of the shared electric drive motor 18, and thus circulate at the same speed. In principle, a transmission for changing the rotational speed of one of the impellers would also be conceivable. The impellers are preferably analogous to each other in structure. In the region depicted above in FIG. 2 ventilated by the twin fan 6, the ambient air from the external volume 14 is now drawn in via the air inlet openings 19 located there, and flows through in a similar manner as in the other part of the integrated cooling module 1 between the cooling pins 4 on the second side 16 to the air outlet openings 20. The ambient air from the external volume 14 can absorb heat from the cooling pins 4 of the second side 16 of the cooling element 3 or of its central part 15, and release it into the environment. An efficient cooling of the interior volume 13 is thus possible without the volumes being fluidically connected to each other. Rather, they may be completely sealed.

This plays a decisive role, in particular in the case of the headlight 21 shown in FIG. 3 already mentioned. Its structure consists of a housing 22 and a transparent cover disc 23. Two fields 24 having light-emitting diodes are arranged, in a purely exemplary form, under this cover disc 23. In addition, within the housing 22, and thus in the internal volume 13 of the headlight 21, a control device 25 and a stepper motor 26 are indicated in an exemplary form. These elements in the internal volume 13 of the headlight 21 produce waste heat, which in practice can largely only be removed via the cover disc 23. In order to improve the cooling here, such that a high performance of the components within the internal volume 13 of the headlights 21 can be achieved without these components overheating, the cooling module 1 is now integrated into the headlight 21, as depicted in FIG. 3. Parts of the housing 22 of the headlight form the wall 9 shown in FIG. 2. Via the cooling module 1, heat is thus transferred from the internal volume 13 of the headlight 21 into the volume surrounding the headlight 21, which accordingly corresponds to the external volume 14 in the structure according to FIG. 2. The internal volume 13 of the headlight 21 itself can furthermore be hermetically sealed in order to prevent the intrusion of moisture, which could damage the electrical, and in particular optical components within the headlight 21.

The structure of the integrated cooling module 1 is exceptionally efficient and compact. In addition to cooling via the cover disc 23, cooling in other regions surrounding the headlight 21 is also thus enabled, for example in the region of an engine compartment, of a body cavity, or the like. The structure is exceptionally simple and efficient. It can be electrically connected both from the internal volume 13 of the headlight 21 and from the external volume 14. Only one electrical connection is necessary for the shared drive motor 18, such that this shared drive motor 18 starts working, for example, when the light is switched on, without complex control, regulation or the like being necessary for this purpose.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A cooling module comprising:

a cooling element having a closed central part sealing regions lying on first and second opposite sides of the closed central part against each other, wherein the cooling element also includes heat-conducting elements on the first and second sides of the closed central part; and an integrated twin fan configured to feed ambient air from the first side of the closed central part and configured to feed ambient air from the second side of the closed central part to the cooling element, wherein the integrated twin fan has two fan wheels sealed against each other and an electric drive motor configured to drive the two fan wheels, wherein the twin fan is a radial fan.

2. The cooling module of claim 1, wherein the electric drive motor is arranged centrally between the two fan wheels.

3. The cooling module of claim 1, wherein the twin fan is configured to feed the ambient air from the first and second respective sides of the closed central part on a pressure side to the heat-conducting elements of the respective first and second side of the closed central part.

4. The cooling module of claim 1, wherein the heat-conducting elements are cooling ribs or cooling fingers.

5. The cooling module of claim 1, wherein the cooling module is integrated in a cooling module housing, wherein the cooling module housing includes air inlet openings and air outlet openings for each of the first and second sides of the closed central part, wherein the air inlet opening and the air outlet openings are arranged on opposite sides of the cooling module housing and in opposite portions of a side of the cooling module housing.

6. A headlight comprising:

a self-contained internal volume;

a transparent cover disc;

lighting means;

means for mechanically and/or electrically controlling the lighting means; and a cooling module comprising a cooling element having a closed central part sealing regions lying on first and second opposite sides of the closed central part against each other, wherein the cooling element also includes heat-conducting elements on the first and second sides of the closed central part; and an integrated twin fan configured to feed ambient air from the first side of the closed central part and configured to feed ambient air from the second side of the closed central part to the cooling element, wherein the integrated twin fan has two fan wheels sealed against each other and an electric drive motor configured to drive the two fan wheels, wherein the closed central part forms a part of a boundary of the internal volume such that the heat-conducting elements of the first side protrude into the internal volume and the heat-conducting elements of the second side protrude into the surrounding environment, and wherein the twin fan is a radial fan.

7. The headlight of claim 6, wherein the twin fan is configured to feed the ambient air from the first and second respective sides of the closed central part on a pressure side to the heat-conducting elements of the respective first and second side of the closed central part.

8. The headlight of claim 6, wherein the headlight is a front headlight of a vehicle.

* * * * *